(12) United States Patent
Kim et al.

(10) Patent No.: US 12,327,370 B2
(45) Date of Patent: Jun. 10, 2025

(54) APPARATUS AND METHOD FOR MONITORING INACTIVE LIVESTOCK

(71) Applicant: Electronics and Telecommunications Research Institute, Daejeon (KR)

(72) Inventors: You Jin Kim, Daejeon (KR); Se Han Kim, Daejeon (KR); Dae Heon Park, Daejeon (KR); Hyeon Park, Daejeon (KR); Jee Sook Eun, Daejeon (KR); Jae Young Jung, Daejeon (KR); Seng Kyoun Jo, Daejeon (KR); Won Kyu Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 405 days.

(21) Appl. No.: 17/847,612

(22) Filed: Jun. 23, 2022

(65) Prior Publication Data

US 2023/0115772 A1   Apr. 13, 2023

(30) Foreign Application Priority Data

Oct. 12, 2021   (KR) .................. 10-2021-0135143
Dec. 15, 2021   (KR) .................. 10-2021-0179946

(51) Int. Cl.
*G06T 7/70*       (2017.01)
*A01K 29/00*      (2006.01)
(Continued)

(52) U.S. Cl.
CPC .............. *G06T 7/70* (2017.01); *A01K 29/005* (2013.01); *G06V 10/762* (2022.01); *G06V 20/41* (2022.01);
(Continued)

(58) Field of Classification Search
CPC ............ G06T 7/70; G06T 2207/10016; H05B 47/175; H05B 47/125; G06V 10/762;
(Continued)

(56) References Cited

U.S. PATENT DOCUMENTS 9,055,226 B2 *   6/2015   Densham .............. G03B 21/53
11,617,353 B2 *   4/2023   Huber ................. A01M 25/004
                                                     340/573.2
(Continued)

FOREIGN PATENT DOCUMENTS

JP   7383435      11/2023
KR   10-1342158   12/2013
(Continued)

*Primary Examiner* — Matthew C Bella
*Assistant Examiner* — Jinsu Hwang
(74) *Attorney, Agent, or Firm* — KILE PARK REED & HOUTTEMAN PLLC (57) ABSTRACT

Disclosed is a monitoring method for visualizing a location of an inactive livestock in a livestock pen. This method includes extracting, by a video analysis device, livestock objects from a video image acquired for each frame and subsequently calculating center coordinates indicating a location of the inactive livestock based on coordinates of the
(Continued)

extracted livestock objects, displaying, by a display device, an object icon representing the inactive livestock in a display region mapped to the calculated center coordinate among a plurality of display regions defined on a display screen, and emitting light by light emitting units selected based on the calculated center coordinate, among a plurality of lighting units installed in a livestock structure.

18 Claims, 4 Drawing Sheets (51) Int. Cl.
*G06V 10/762* (2022.01)
*G06V 20/40* (2022.01)
*G06V 40/10* (2022.01)
*H04N 7/18* (2006.01)
*H05B 47/125* (2020.01)
*H05B 47/175* (2020.01)

(52) U.S. Cl.
CPC ............. *G06V 40/10* (2022.01); *H04N 7/183* (2013.01); *H05B 47/125* (2020.01); *H05B 47/175* (2020.01); *G06T 2207/10016* (2013.01)

(58) Field of Classification Search
CPC ...... G06V 40/10; G06V 20/41; A01K 29/005; H04N 7/183
See application file for complete search history.

(56) References Cited

U.S. PATENT DOCUMENTS

| | | | |
|---|---|---|---|
| 2014/0046152 A1* | 2/2014 | Bechtel | A61B 5/14552 600/323 |
| 2016/0120144 A1 | 5/2016 | Kim et al. | |
| 2016/0205894 A1 | 7/2016 | Kim et al. | |
| 2020/0125849 A1* | 4/2020 | Labrecque | A01K 5/02 |
| 2021/0045362 A1* | 2/2021 | Gritzman | A01K 29/005 |
| 2021/0404877 A1* | 12/2021 | Lee | G06V 40/171 |

FOREIGN PATENT DOCUMENTS

| | | |
|---|---|---|
| KR | 10-2016-0017904 | 2/2016 |
| KR | 10-1944374 | 1/2019 |
| KR | 10-2019-0015826 | 2/2019 |
| KR | 10-1995755 | 6/2019 |
| KR | 10-2020-0143082 | 12/2020 |
| KR | 10-2021-0080637 | 7/2021 |

* cited by examiner

APPARATUS AND METHOD FOR MONITORING INACTIVE LIVESTOCK

CROSS-REFERENCE TO RELATED APPLICATIONS

This application claims the benefit of the Korean Patent Application Nos. 10-2021-0135143 filed on Oct. 12, 2021 and 10-2021-0179946 filed on Dec. 15, 2021, which are hereby incorporated by reference as if fully set forth herein.

BACKGROUND

Field of the Invention

The present invention relates to an apparatus and method for monitoring inactive livestock showing abnormal signs in a livestock pen.

Discussion of the Related Art

Image-based monitoring technology has been generally used as a method of monitoring inactive livestock (abnormal livestock) in livestock pens. For example, a camera sensor is installed on the ceiling or side of a livestock pen and a livestock pen manager analyzes a livestock image acquired by the installed camera sensor to monitor a condition, movement and posture of the livestock.

However, in the case of photographing livestock in a livestock pen, for example, a large number of pigs gathered in a colony, by using a camera sensor installed at a fixed location, a situation in which the camera sensor cannot photograph inactive pigs (abnormal pigs) covered by active pigs (normal pigs) may occur. That is, it may not be possible to monitor inactive pigs in which abnormal signs are captured through an image.

SUMMARY

An aspect of the present invention is directed to providing an apparatus and method for monitoring an inactive livestock more easily by visualizing the inactive livestock showing an abnormal sign so that a livestock pen manager may intuitively recognize a location of the inactive livestock.

To achieve these and other advantages and in accordance with the purpose of the invention, as embodied and broadly described herein, there is provided a method for monitoring an inactive livestock, as a monitoring method for visualizing a location of an inactive livestock in a livestock pen, including: extracting livestock objects from a video image acquired for each frame; calculating center coordinates indicating a location of the inactive livestock based on coordinates of the extracted livestock objects; and displaying an object icon representing the inactive livestock in a display region mapped to the calculated center coordinate among a plurality of display regions defined on a display screen.

In another aspect of the present invention, there is provided a method for monitoring an inactive livestock, as a monitoring method for visualizing a location of an inactive livestock in a livestock pen, including: extracting, by a video analysis device, livestock objects from a video image acquired for each frame and subsequently calculating center coordinates indicating the location of the inactive livestock based on coordinates of the extracted livestock objects; displaying, by a display device, an object icon representing the inactive livestock in a display region mapped to the calculated center coordinate among a plurality of display regions defined on a display screen; and emitting light by light emitting units selected based on the calculated center coordinate, among a plurality of lighting units installed in a livestock structure.

In another aspect of the present invention, there is provided an apparatus for monitoring an inactive livestock including a video camera device configured to photograph a livestock in a livestock pen to acquire video images including livestock objects for each frame; a video analysis device configured to extract livestock objects from the video image and calculate center coordinates indicating a location of an inactive livestock in the livestock pen based on coordinates of the extracted livestock objects; a display device configured to display an object icon representing the inactive livestock in a display region mapped to the calculated center coordinate, among a plurality of display regions defined on a display screen; a lighting device installed on a boundary structure within the livestock pen and including lighting units selected from among the plurality of lighting units to emit light according to the calculated center coordinate; and a probe bar device configured to, by a livestock pen manager, measure biometric information of the inactive livestock existing in the location intuitively recognized by the emitted lighting units and the display region in which the object icon is displayed.

It is to be understood that both the foregoing general description and the following detailed description of the present invention are exemplary and explanatory and are intended to provide further explanation of the invention as claimed.

DETAILED DESCRIPTION OF THE INVENTION

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 1:
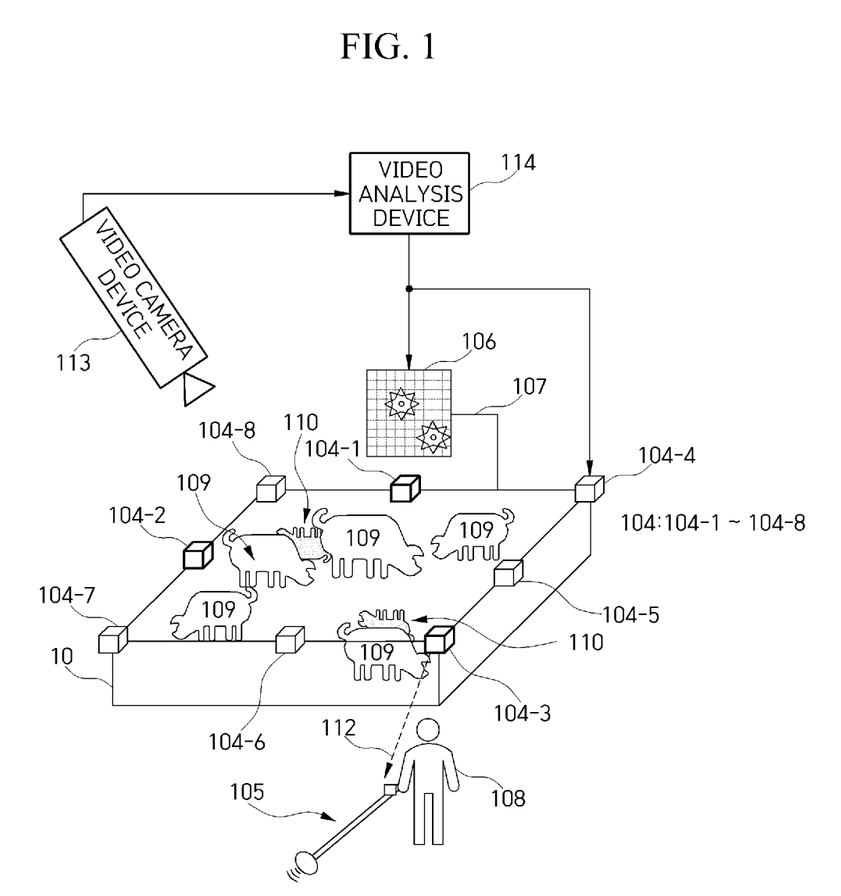
FIG. 1 is a schematic configuration diagram of an apparatus for monitoring an inactive pig according to an embodiment of the present invention.

FIG. 1 is a schematic configuration diagram of an apparatus for monitoring an inactive livestock according to an embodiment of the present invention.

Referring to FIG. 1, the monitoring device according to an embodiment of the present invention provides a function to more easily monitor an inactive livestock by visualizing a location of the inactive livestock in the livestock pen to be intuitively recognized.

In the present specification, although a livestock pen is described to be limited to a facility that breeds pigs, it is not intended to limit a monitoring target to pigs. The inside of the livestock pen may be divided into a number of zones for accommodating pigs, and one zone being is shown in FIG. 1.

An apparatus for monitoring an inactive pig according to an embodiment of the present invention includes a video camera device 113, a video analysis device 114, a display device 106, a lighting device 104, and a probe bar device 105.

The video camera device 113 is installed in an upper portion of the livestock pen and photographs pigs 109 and 110 accommodated in each zone to acquire video information including a plurality of pig objects.

The video analysis device 114 analyzes the image information input from the video camera device 113 to generate a video analysis result including location information of the inactive pigs 110 showing abnormal signs, and transmits the generated video analysis result to the display device 106. The display device 106 may be connected to the video analysis device 114 by wire in order to receive the video analysis result from the video analysis device 114.

The video analysis device 114 may transmit the video analysis result or the location information of the inactive pig 110 included in the video analysis result to an external management system.

The video analysis device 114 may be implemented as a computer device including a processor including at least one CPU and/or at least one GPU capable of executing and processing various video processing algorithms to analyze video information from the video camera device 113, a memory for temporarily storing intermediate data and result data processed by the processor, and a communication module.

The display device 106 may be installed in a boundary structure 10 defining each zone divided within the livestock pen by means of a fixing member 107 manufactured in a certain shape. The display device 106 displays the location of the inactive pigs 110 showing abnormal signs among the pigs 109 and 110 according to the video analysis result received from the video analysis device 114.

The lighting device 104 may include a plurality of lighting units 104-1 to 104-8 installed in the boundary structure 10, and receive the video analysis result from the video analysis device 114. The lighting device 104 may be connected to the video analysis device 114 by wire or wirelessly in order to receive the video analysis result from the video analysis device 114.

Some of the lighting units 104-1, 104-2, and 104-3, among the plurality of lighting units 104-1 to 104-8, may operate to emit light according to location information of the inactive pigs 110 included in the video analysis result.

The lighting units 104-1, 104-2 and 104-3, which emit light, may be lighting units located at vertex coordinates of a virtual triangle area including the location of inactive pigs 110.

As such, the location of the inactive pigs 110 is visually displayed by the display device 106 and the lighting device 104, so that the livestock pen manager 108 may intuitively recognize the location of the inactive pigs 110.

Meanwhile, each lighting unit may be, for example, a visible light communication (VLC)-based LED lighting unit in which a beacon sensor or a beacon chip is embedded. Here, the visible light communication refers to communication technology using visible light that may be seen with the eyes as a medium. The present invention is not characterized by visible light communication, and therefore, a description thereof is substituted by known art.

The probe bar device 105 includes a communication module that communicates with the lighting device 104 according to the VLC method and a sensor module that may measure a biometric signal of the inactive pigs 110. A structure and operation of the probe bar device 105 will be described below with reference to FIG. 3.

Figure 2:
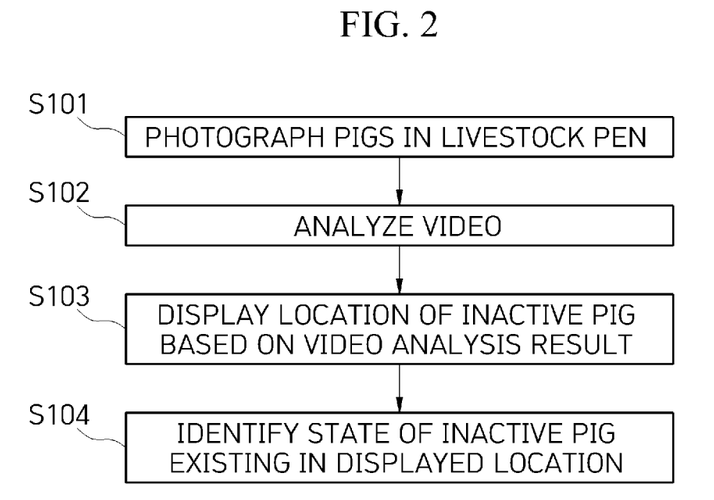
FIG. 2 is a flow diagram illustrating a method for monitoring an inactive pig using the apparatus shown in FIG. 1.

FIG. 2 is a flowchart illustrating a method for monitoring an inactive pig using the apparatus shown in FIG. 1.

Referring to FIG. 2, the method of monitoring an inactive pig may be largely divided into a photographing operation S101, an analysis operation S102, a notification operation S103 and an identifying operation S104, but this is to help the understanding of the description and is not intended to be limiting. Accordingly, each operation may be subdivided into several operations or some operations may be integrated into one operation within a range that may be easily predicted by those skilled in the art from the following description.

First, in the photographing operation S101, the video camera 113 photographs the pigs in a livestock pen to obtain video information on the pigs.

Next, in the analysis operation S102, the video analysis device 114 analyzes the video information obtained by the video camera device 113 to determine an abnormal state of the pigs.

Next, in the notification operation S103, the display device 106 visually displays a location of the inactive pigs 110 according to the video analysis result from the video analysis device 114.

In addition, in the notification operation S103, some lighting devices 104-1, 104-2, and 104-3 included in the lighting device 104:104-1 to104-8 operate to emit light according to the video analysis result from the video analysis device 114. In this case, some of the lighting devices 104-1, 104-2, and 104-3 may be lighting units located at vertices of the virtual triangle area including the location of the inactive pig 110 identified according to the video analysis result.

Next, in the identifying operation S104, the livestock pen manager 108 may perform a process of receiving a notification message indicating the appearance of an inactive pig showing abnormal signs from the video analysis device 114 through his user terminal (e.g., a smartphone, etc.) or a personal computer. Here, the user terminal (e.g., a smartphone, etc.) or the personal computer of the livestock pen manager 108 may communicate with the video analysis device 114 by wire or wirelessly to receive the notification message indicating the appearance of an inactive pig.

In addition, in the identifying operation (S104), when the livestock pen manager 108 identifies the notification message, the livestock pen manager 108 may move to the livestock pen after, carrying the probe bar device 105, and intuitively identifying the location the inactive pigs 110 through the display device 106.

In addition, in the identifying operation (S104), the livestock pen manager 108 may intuitively check the location of the inactive pigs 110 through the virtual triangle area formed by the light emitting units 104-1 to 104-3 which emit light.

In addition, in the identifying operation S104, the livestock pen manager 108 measures a biometric signal of the inactive pig 110 present at the location intuitively recognized through the display device 106 and/or the lighting device 104 using the probe bar device 105.

In addition, in the identifying operation S104, the probe bar device 105 may configure the location information of the lighting device 104 obtained through visible light communication with the lighting device 104 as location information of the probe bar device 105 and transmit the location information of the probe bar device 105 to an external management system via the video analysis device 114. Here, the probe bar device 105 may directly transmit the location information of the probe bar device 105 to the external management system, without going through the video analysis device 114. In this case, when the external management system is located in a short distance, the probe bar device 105 and the external management system may communicate with each other according to a short-range wireless communication method, and when the external management system is located at a remote location, the probe bar device 105 may communicate with the external management system by using the user terminal of the livestock pen manager 108 as an intermediate medium. In this case, the probe bar device 105 and the user terminal may communicate with each other according to a short-range wireless communication method, and the user terminal and the external management system may communicate with each other through a mobile communication network.

Figure 3:
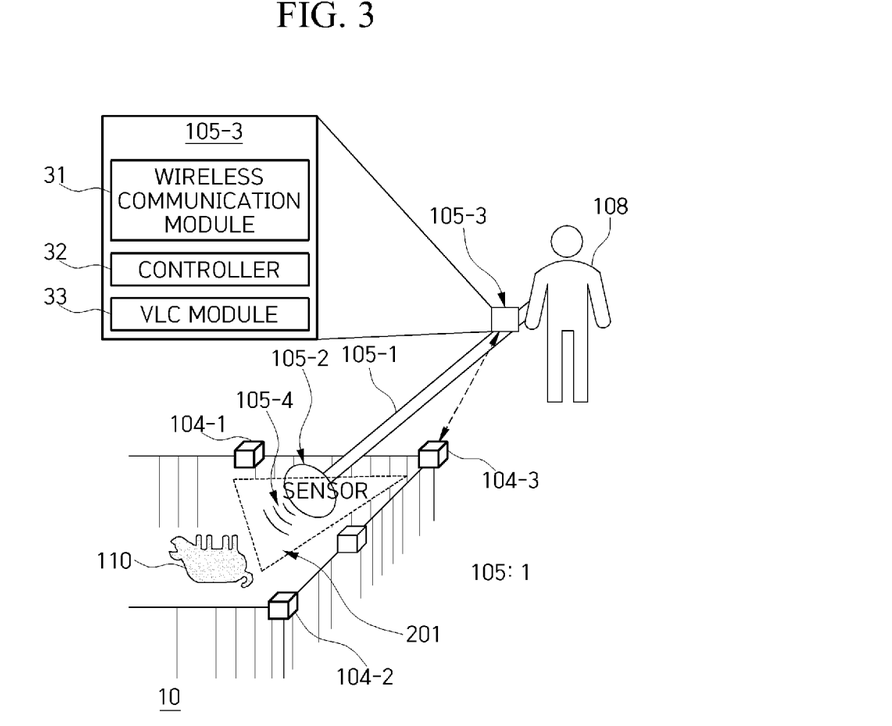
FIG. 3 is a view illustrating a structure and operation of a probe bar device shown in FIG. 1.

FIG. 3 is a diagram illustrating a schematic structure and operation of the probe bar device shown in FIG. 1.

Referring to FIG. 3, the probe bar device 105 may include a stick body 105-1 extending in a straight line, a sensor module 105-2 installed at one end of the stick body 105-2, and a communication module 105-3 installed at the other end of the stick body 105-1.

The livestock pen manager 108 intuitively identifies the virtual triangle area 201 formed by the light-emitting lighting units 104-1, 104-2 and 104-3, and then measures a biometric signal 105-4 of the pig 110 located in the virtual triangle area 201 by using the sensor module 105-2 installed at one end of the stick body 105-2.

When the sensor module 105-2 measures a biometric signal indicating inactivity from the pig 110, the sensor module 105-2 processes the measured biometric signal into biometric information, and transmits the processed biometric information to the communication module 105-3 installed at the other end of the stick body 105-2. In this case, the communication module 105-3 may be connected to the sensor module 105-2 by wire and/or wirelessly and may be configured to receive the biometric information from the sensor module 105-2.

In addition, the communication module 105-3 receives a VLC message according to a visible light communication (VLC) method with at least one lighting unit among the light-emitting lighting units 104-1, 104-2 and 104-3. The VLC message includes location information of the lighting unit.

In addition, the communication module 105-3 may configure the location information of the lighting unit received from the at least one lighting unit as location information of the probe bar device 105 (or location information of the livestock pen manager 108 and transmit the configured location information of the probe bar device 105 to the video analysis device 114 together with the biometric information. The video analysis device 114 may transmit the biometric information of the inactive pig and the location information of the probe bar device 105 received from the communication module 105-3 to an external management system.

In order to transmit the biometric information of the inactive pig and the location information of the probe bar device 105 to the video analysis device 114, the communication module 105-3 includes a wireless communication module 31 and a controller 32 controlling an operation of the wireless communication module 31. Additionally, the communication module 105-3 may further include a VLC module 33 supporting visible light communication (VLC).

The wireless communication module 31 transmits the biometric information of the inactive pig and the location information of the probe bar device 105 to the video analysis device 114 under the control of the controller 32.

The VLC module 33 may receive the VLC message including the location information of the light-emitting lighting units from the light-emitting lighting units 104-1, 104-2 and 104-3 under the control of the controller 32, and may recognize the location of the probe bar device 105, that is, the location of the livestock pen manager 108, through the VLC message.

Meanwhile, in order to measure a precise location of the probe bar device 105, an indoor positioning technique based on visible light communication may be used. For example, the controller 32 may precisely measure the location of the probe bar device 105 according to a triangulation technique using coordinate values respectively received from the light-emitting lighting units 104-1, 104-2 and 104-3 through the VLC module 33 and a received signal strength value (RSSI) of the VLC signal including each coordinate value. For reference, the location coordinates of the probe bar device 105 according to the triangulation technique may be location coordinates indicating an intersection of three calculated circles after the three circles using a distance value according to the RSSI (distance value from the VLC module 33 to each lighting unit) as a radius based on each coordinate value as a center point is calculated.

As described above, the livestock pen manager 108 may intuitively recognize the location of the inactive pig 110 showing abnormal signs through the virtual triangle area 201 formed by the location of the inactive pig displayed by the display device 106 and the light-emitting lighting units 104-1, 104-2, and 104-3.

Thereafter, in order to actually identify the abnormal sign of the inactive pig 110, the livestock pen manager 108 moves the sensor module 105-2 of the probe bar device 105 toward the pig 110 showing the abnormal signs and measures a biometric signal of the corresponding pig 110, and the communication module 105-3 of the probe bar device 105 transmits a measurement result (biometric information) to the video analysis device 114. Thereafter, the video analysis device 114 transmits the location information of the inactive pig 110, the biometric information of the inactive pig received from the probe bar device 105, and the location information of the probe bar device 105 to the external management system.

Figure 4:
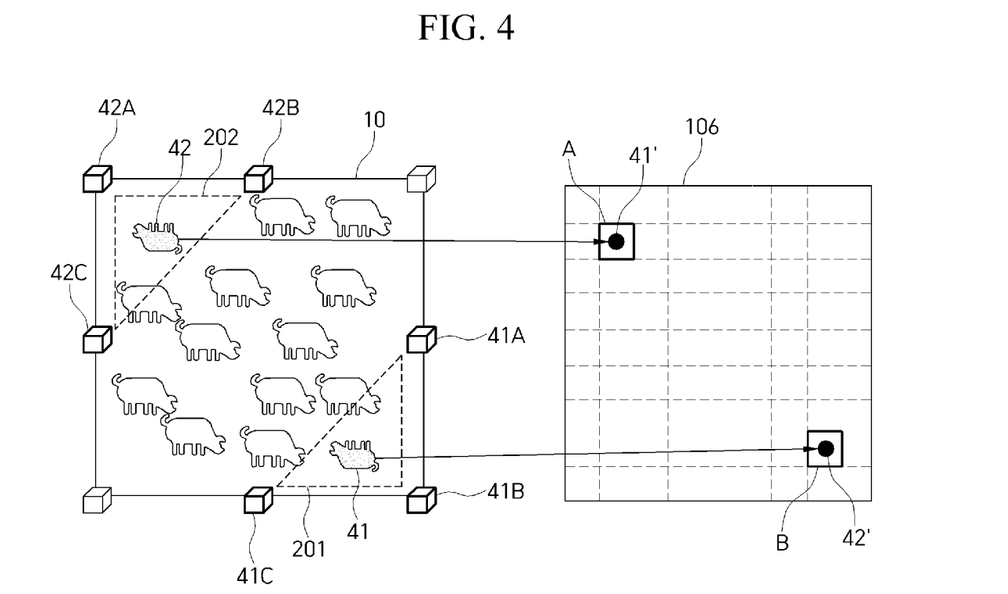
FIG. 4 is a diagram illustrating an example of a screen configuration displayed by a display device shown in FIG. 1.

FIG. 4 is a diagram illustrating a location of an inactive pig shown through a display screen of the display device shown in FIG. 1.

Referring to FIG. 4, as described above, the video analysis device 114 analyzes the image information transmitted from the video camera device 113, detects the location information of the inactive pig, and transmits the detected location information of the pig to the display device 106.

The display device 106 displays the location information of the inactive pig received from the video analysis device 114 as an object icon of a specific shape (e.g., a circle shape). On the display screen of the display device 106, a plurality of display regions are divided in a matrix form, and object icons 41' and 42' representing inactive pigs 41 and42 are displayed in display regions A and B mapped to locations of the inactive pigs 41 and 42, among the plurality of display regions. In this case, in order to increase visibility, the object icons may be displayed in a blinking form.

Also, as described above, the lighting units located at the vertices of the virtual triangle area including the location of the inactive pig, among the plurality of lighting units, emit light so that the livestock pen manager intuitively recognizes the location of the inactive pig through the lighting device.

When the video analysis device 114 analyzes the video information and detects first location information of the first inactive pig 41 and second location information of the second inactive pig 42, lighting units 41A, 41B, and 41C located at the vertices of a virtual triangle area 201 including the location value included in the first location information emit light, and lighting units 42A, 42B and 42C located at the vertices of a virtual triangle area 202 including the location value included in the second location information emit light, so that the livestock pen manager may intuitively recognize the locations of the inactive pigs 41 and 42 by the light emitting operation of the lighting units 41A, 41B, 41C, 42A, 42B, and 42C.

Meanwhile, in the present embodiment, an example in which three lighting units emit light for the livestock pen manager to intuitively recognize the location of one inactive pig has been described, but the present invention may also be applied even when two lighting units emit light.

If two lighting units emit light, the livestock pen manager may expect an inactive pig to be located on an imaginary line connecting the two lighting units. When a plurality of pigs are located on the virtual line, the livestock pen manager cannot intuitively recognize which pig is an inactive pig, but when the livestock pen manager simultaneously refers to the location of the inactive pig displayed by the display device 106, the livestock pen manager may easily recognize which pig is an inactive pig among a plurality of pigs located on the virtual line. Accordingly, the present invention may be sufficiently applied even when two lighting units emit light.

Figure 5:
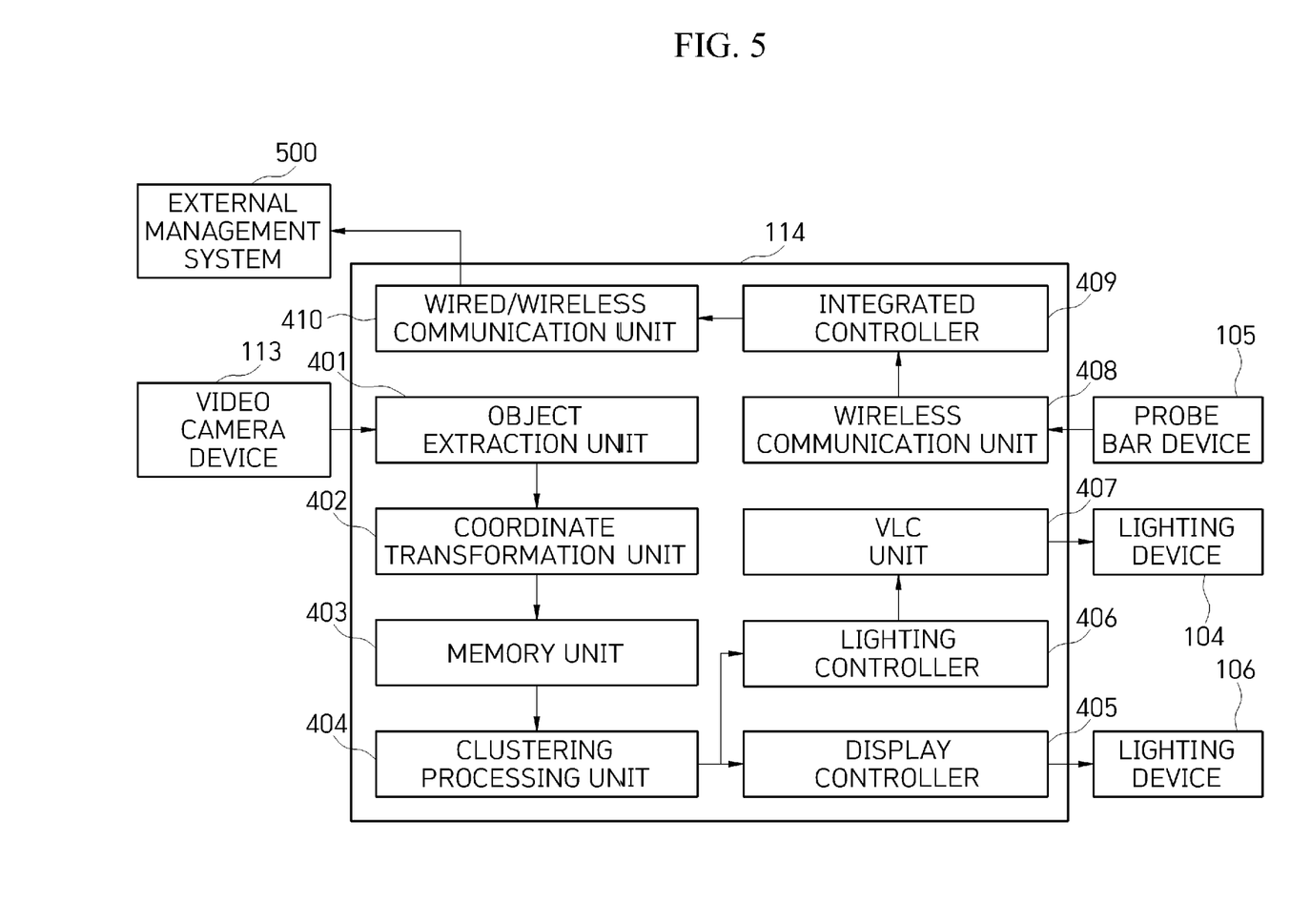
FIG. 5 is a detailed configuration diagram of a video analysis device shown in FIG. 1.

FIG. 5 is a detailed configuration diagram of a video analysis device shown in FIG. 1.

First, referring to FIG. 5, the video analysis device 114 includes an object extraction unit 401, a coordinate transformation unit 402, a memory unit 403, a clustering processing unit 404, a display controller 405, a lighting controller 406, a VLC unit 407, a wireless communication unit 408, an integrated controller 409, and a wired/wireless communication unit 410.

The object extraction unit 401 extracts pig object information from video information (video image) acquired by the video camera device 113 in units of frames. Here, the pig object information includes a pig object image from which a background is removed and coordinates of the pig object included in the pig object image.

For the extraction of pig object information, a known video processing algorithm such as a background removal algorithm for removing a background image from a video image, an object extraction algorithm for extracting an object in a video image, an object tracking algorithm for tracking a movement of the extracted object, etc. may be used.

The coordinate transformation unit 402 transforms the coordinates of the pig object extracted by the object extraction unit 401 into coordinates expressible in a screen coordinate system used in the display device 106 using a known coordinate transformation algorithm. Since the coordinates of the pig object extracted by the object extraction unit 401 are expressed in a camera coordinate system, the coordinates of the pig object should be transformed into coordinates that may be expressed in the screen coordinate system in order to map the coordinates to the display screen of the display device 106.

The memory unit 403 includes a volatile memory and a non-volatile memory, and the memory unit 403 stores the coordinates of the pig object transformed by the coordinate transformation unit 402 in units of frames.

The clustering processing unit 404 clusters coordinates representing the movement of the inactive pig, among the coordinates of the pig object stored in the memory unit 403 for every frame, using a clustering algorithm and calculates center coordinates of the clustered coordinates. Here, the center coordinates may be, for example, coordinates indicating an average of the clustered coordinates.

The display controller 405 may generate a control signal for controlling a display operation of a display region mapped to the center coordinates, among a plurality of display regions arranged in a matrix on the display screen of the display device 106, according to the center coordinates input from the clustering processing unit 404, and transmits the generated control signal to the display device 106. Here, the control signal may include row and column address data indicating an address of the display region mapped to the center coordinates and output timing data of an object icon displayed on the display region.

The display device 106 displays an object icon representing an inactive pig in the display region mapped to the center coordinates according to the control signal. In this case, in order to increase the visibility of the object icon, the object icon displayed on the display region is displayed in a blinking form according to the determined output timing data.

The lighting controller 406 generates a dimming control signal for controlling a dimming operation of at least three lighting units selected from a plurality of lighting units 104-1 to 104-8 included in the lighting device 104 according to the center coordinate input from the clustering processing unit 404. A dimming control signal is generated to control the dimming operation.

In order to select the at least three lighting units, first, the lighting controller 406 selects three coordinates from the coordinates of all lighting units installed at the boundary structure (10 in FIG. 1), generates a triangle area connecting the three selected coordinates on a two-dimensional planar coordinate system, and determines whether the center coordinate exist in the generated triangle area.

When the center coordinates exist in the generated triangle area, the lighting controller 406 generates a dimming control signal for three lighting units corresponding to the selected three coordinates.

If the center coordinates do not exist in the generated triangle area, the lighting controller 406 creates another triangle area connecting three other selected coordinates and determines whether the center coordinates exist in the other triangle area, and this determination process is repeated until a triangle area containing (surrounding) the center coordinates is detected.

Meanwhile, when the number of triangle areas including the center coordinate is plural, the lighting controller 406 selects a triangle area having the smallest area, and generates a dimming control signal for the lighting units corresponding to the vertex coordinates of the selected triangle area.

The reason for selecting the triangle area having the smallest area is to reduce the area of the virtual triangle area formed by the dimming operation of the lighting units, so that the livestock pen manager may more accurately and intuitively recognize the location of the inactive pig.

The VLC unit 407 configures the dimming control signal input from the lighting controller 406 into a visible light communication (VLC) message, and transmits the configured visible light communication (VLC) message to the three selected lighting units according to a visible light communication method.

The three selected lighting units emit light according to the VLC message received from the VLC unit 407, and the livestock pen manager intuitively recognizes the location of the active pig through the virtual triangle area formed by the three light-emitting lighting units.

The wireless communication unit 408 receives the biometric information of the inactive pig and the location information of the probe bar device 105 from the communication module 105-3 of the probe bar device 105 using a wireless communication method. Here, the wireless communication method may be, for example, Wi-Fi or Bluetooth communication.

The integrated controller 409 transmits the biometric information of the inactive pig and the location information of the probe bar device 105 received through the wireless communication unit 408 to the wired/wireless communication unit 410. In this case, the integrated controller 409 may process the biometric information of the inactive pig and the location information of the probe bar device 105 as necessary and transmit the processed information to the wired/wireless communication unit 410.

The wired/wireless communication unit 410 transmits the biometric information of the inactive pig and the location information of the probe bar device 105 transmitted from the integrated controller 409 to the external management system 500 in a wired and/or wireless communication method, and the external management system 500 stores the biometric information of the inactive pig and the location information of the probe bar device 105 received from the wired/wireless communication unit 410 in a database and utilizes the information as management data necessary for the operation of the pig livestock pen.

Meanwhile, the integrated controller 409 controls and manages an overall operation of the peripheral components 401 to 408 and 410 included in the video analysis device 114, and to this end, the integrated controller 409 may be a microcontroller unit (MCU) manufactured to include at least one CPU.

The components 401 to 410 shown in FIG. 5 are merely classified by function to help the understanding of the description, and it is not intended that the video analysis device 114 of the present invention necessarily includes the components 401 to 410 illustrated in FIG. 5. In some cases, some components may be integrated into one component. For example, the object extraction unit 410, the coordinate transformation unit 402, the memory unit 403 and the clustering processing unit 404 may be embedded in the integrated controller 409, and the VLC unit 407 having a communication function, the wireless communication unit 408, and the wired/wireless communication unit 410 may be integrated into one communication module.

In addition, some of the components 401 to 410 shown in FIG. 5 may be mounted in another device physically separated from the video analysis device 114. In addition, some of the components 401 to 410 shown in FIG. 5, for example, the object extraction unit 410, the coordinate transformation unit 402, the memory unit 403 and the clustering processing unit 404 may be implemented as a software module executed by at least one CPU, at least one GPU, and an integrated controller.

Figure 6:
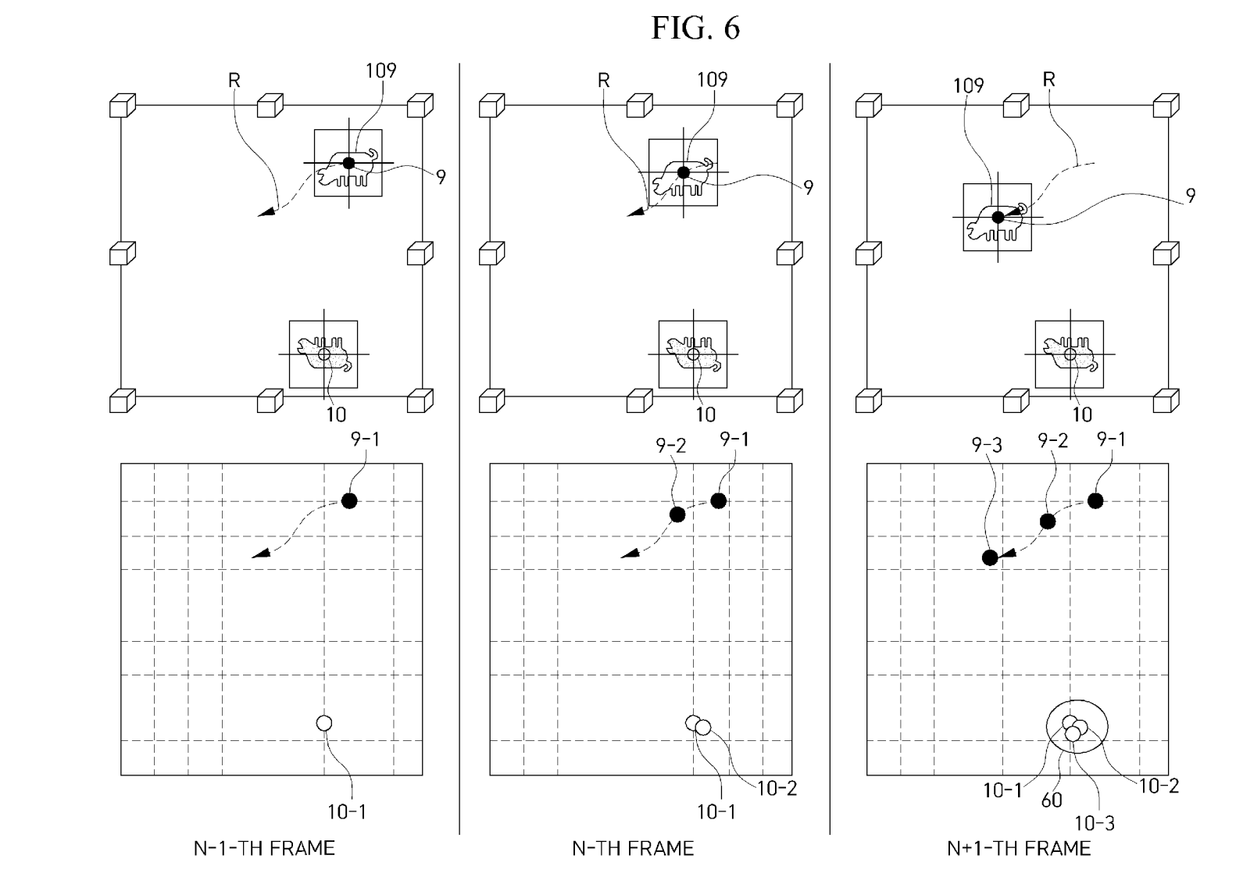
FIG. 6 is a view illustrating a clustering process performed by a clustering processing unit shown in FIG. 5.

FIG. 6 is a view illustrating a clustering process performed by the clustering processing unit shown in FIG. 5.

Referring to FIG. 6, first, it is assumed that an active pig 109 moves according to a movement path R. Center coordinates 9 of the active pig 109 extracted from a video image of an N-1-th frame are mapped to 9-1 on the display screen of the display device 106, and the center coordinates 9 of 109 of the active pig extracted from the video image of an N-th frame are mapped to 9-2 on the display screen according to the movement of the active pig 109. Also, the center coordinates 9 of the active pig 109 extracted from the video image of the N+1-th frame are mapped to 9-3 on the display screen according to the movement of the active pig 109. As such, the center coordinates 9-1 to 9-3 of the active pig 109 appearing over the three frames are widely distributed on the display screen.

In contrast, since a movement of an inactive pig is not active, the center coordinates 10-1 to 10-3 of the active pig 109 appearing over three frames are distributed in a dense form on the display screen, and thus, the coordinates of the inactive pig object may be clustered according to the clustering process.

According to the present invention, the livestock pen manager may intuitively recognize a location of an inactive livestock showing abnormal signs through a display device and a lighting device installed in a livestock pen, identify a status of an inactive livestock through a probe bar device, and automatically transmit an identifying result to an external management system, thereby efficiently manage livestock pen management.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for monitoring an inactive livestock, as a monitoring method for visualizing a location of an inactive livestock in a livestock pen, the method comprising:
   extracting livestock objects from a video image acquired for each frame;
   calculating center coordinates indicating a location of the inactive livestock based on coordinates of the extracted livestock objects; and
   displaying an object icon representing the inactive livestock in a display region mapped to the calculated center coordinate among a plurality of display regions defined on a display screen; and
   emitting light by light emitting units selected based on the calculated center coordinate, among a plurality of lighting units installed in a livestock structure, wherein
the emitting of light by the selected light emitting units includes:
generating, by a lighting controller included in the video analysis device, a triangle area by connecting three coordinates selected from coordinates of the plurality of lighting units represented on a two-dimensional plane coordinate system,
determining whether the center coordinate exists in the triangle area; and
when the center coordinate exists in the triangle area generating a dimming control signal for controlling light emitting operation of three lighting units corresponding to the three coordinates.

2. The method of claim 1, further comprising:
intuitively recognizing, by a livestock pen manager, a location of the inactive livestock based on a display region in which the object icon is displayed and subsequently moving, by the livestock pen manager, a probe bar device to the intuitively recognized location of the inactive livestock, after the displaying of the object icon representing the inactive livestock; and
measuring, by the probe bar device, biometric information of the inactive livestock and then transmitting the measured biometric information to an external management system.

3. The method of claim 1, wherein
the calculating of the center coordinate indicating the location of the inactive livestock includes:
clustering coordinates indicating a movement of an inactive livestock, among coordinates of the extracted livestock objects; and
calculating center coordinates of the clustered coordinates.

4. The method of claim 3, wherein the calculating of the center coordinate of the clustered coordinates includes calculating the center coordinate indicating an average of the clustered coordinates.

5. The method of claim 3, further comprising:
transforming the coordinates of the extracted livestock objects represented in a camera coordinate system into coordinates displayed on a screen coordinate system based on a coordinate transformation algorithm.

6. A method for monitoring an inactive livestock, as a monitoring method for visualizing a location of an inactive livestock in a livestock pen, the method comprising:
extracting, by a video analysis device, livestock objects from a video image acquired for each frame and subsequently calculating center coordinates indicating a location of the inactive livestock based on coordinates of the extracted livestock objects;
displaying, by a display device, an object icon representing the inactive livestock in a display region mapped to the calculated center coordinate among a plurality of display regions defined on a display screen; and
emitting light by light emitting units selected based on the calculated center coordinate, among a plurality of lighting units installed in a livestock structure,
wherein
the emitting of light by the selected light emitting units includes;
generating, by a lighting controller included in the video analysis device, a triangle area by connecting three coordinates selected from coordinates of the plurality of lighting units represented on a two-dimensional plane coordinate system;
determining whether the center coordinate exists in the triangle area, and
when the center coordinate exists in the triangle area, generating a dimming control signal for controlling light emitting operation of three lighting units corresponding to the three coordinates.

7. The method of claim 6, wherein
the emitting of light by the selected light emitting units includes emitting light by three light emitting units located in coordinates of vertices of a triangle area including the calculated center coordinate, among the plurality of light emitting units.

8. The method of claim 6, wherein
the emitting of light by the selected light emitting units includes:
receiving, by the selected light emitting units a dimming control signal from the video analysis device according to a visible light communication method; and
emitting light by the selected light emitting units according to the dimming control signal.

9. The method of claim 6, wherein
the emitting of light by the selected light emitting units includes:
generating, by the visible light communication unit included in the video analysis device, a visible light communication message including the dimming control signal and transmitting the generated visible light communication message to the selected lighting units; and
emitting light by the selected lighting units according to the visible light communication message transmitted from the visible light communication unit.

10. The method of claim 6, wherein
intuitively recognizing, by a livestock pen manager, a location of the inactive livestock based on a display region in which the object icon is displayed and a virtual triangle area formed by the emitted lighting units, after the emitting of light by the lighting units;
moving, by the livestock pen manager, a probe bar device to the intuitively recognized location of the inactive livestock; and
measuring, by the probe bar device, biometric information of the inactive livestock and then transmitting the measured biometric information to an external management system.

11. The method of claim 10, wherein
the measuring of biometric information of the inactive livestock and then transmitting the measured biometric information to an external management system by the probe bar device includes:
transmitting, by the probe bar device, the biometric information to the video analysis device according to a wireless communication method; and
transmitting, by the video analysis device, the biometric information received from the probe bar device to the external management system according to a wired or wireless communication method.

12. The method of claim 6, wherein
the calculating of the center coordinate indicating a location of the inactive livestock includes:
clustering coordinates indicating a movement of the inactive livestock, among the coordinates of the extracted livestock objects, based on a clustering algorithm; and
calculating center coordinates of the clustered coordinates.

13. An apparatus for monitoring an inactive livestock, the apparatus comprising:
- a video camera device configured to photograph a livestock in a livestock pen to acquire video images including livestock objects for each frame;
- an video analysis device configured to extract livestock objects from the video image and calculate center coordinates indicating a location of an inactive livestock in the livestock pen based on coordinates of the extracted livestock objects;
- a display device configured to display an object icon representing the inactive livestock in a display region mapped to the calculated center coordinate, among a plurality of display regions defined on a display screen;
- a lighting device installed on a boundary structure within the livestock pen and including lighting units selected from among the plurality of lighting units to emit light according to the calculated center coordinate; and
- a probe bar device configured to, by a livestock pen manager, measure biometric information of the inactive livestock existing in a location intuitively recognized by the emitted lighting units and the display region in which the object icon is displayed, wherein
the emitted light by the selected light emitting units includes:
- a lighting controller included in the video analysis device configured to generate a triangle area by connecting three coordinates selected from coordinates of the plurality of lighting units represented on a two-dimensional plane coordinate system; and
- when the center coordinate exists in the triangle area, a dimming control signal is generated for controlling light emitting operation of three lighting units corresponding to the three coordinates.

14. The apparatus of claim 13, wherein
the probe bar device includes:
- a rod body extending in a straight line;
- a sensor module installed at one end portion of the rod body and configured to measure biometric information of the inactive livestock; and
- a communication module installed at the other end of the rod body and configured to transmit the biometric information to the video analysis device according to a wireless communication method.

15. The apparatus of claim 13, wherein
the video analysis device includes:
- an object detecting unit configured to extract livestock objects from the video image based on an object extraction algorithm;
- a clustering processing unit configured to cluster coordinates indicating a movement of the inactive livestock, among the coordinates of the extracted livestock objects and calculate center coordinates of the clustered coordinates;
- a display controller configured to control the display device to display the object icon in a display region mapped to the calculated center coordinate;
- a lighting controller configured to generate a dimming control signal for controlling a dimming operation of the selected lighting units according to the calculated center coordinate; and
- a visible light communication unit configured to transmit the dimming control signal to the selected lighting units according to a visible light communication method.

16. The apparatus of claim 15, wherein the video analysis device further includes a coordinate transformation unit configured to transform the coordinates of the extracted livestock objects into coordinates expressible in a screen coordinate system.

17. The apparatus of claim 15, wherein
the video analysis device further includes:
- a first communication unit configured to receive the biometric information measured by the probe bar device according to a wireless communication method;
- a second communication unit configured to transmit the biometric information received through the wireless communication unit and information related to the center coordinate indicating the location of the inactive livestock to an external management system according to a wired or wireless communication method; and
- an integrated controller configured to control operations of the first and second communication units.

18. The apparatus of claim 15, wherein
the lighting controller is configured to generate a triangle area by selecting three coordinates from coordinates of the plurality of lighting units represented on a two-dimensional plane coordinate system, and then control a dimming operation of lighting units corresponding to coordinates of vertices of the triangle area when the center coordinate exists in the triangle area.

\* \* \* \* \*